(12) United States Patent
Lamba et al.

(10) Patent No.: US 8,131,290 B2
(45) Date of Patent: Mar. 6, 2012

(54) METHOD AND APPARATUS FOR SUPPORTING POSITIONING OF ROAMING MOBILE STATIONS

(75) Inventors: Gaurav Lamba, Los Altos, CA (US); Kirk Allan Burroughs, Alamo, CA (US); Barbara L. Haskins, Mountain View, CA (US); James D. DeLoach, Jr., Los Altos, CA (US); Zoltan Biacs, San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1198 days.

(21) Appl. No.: 11/844,936

(22) Filed: Aug. 24, 2007

(65) Prior Publication Data

US 2008/0096527 A1    Apr. 24, 2008

Related U.S. Application Data

(60) Provisional application No. 60/866,410, filed on Nov. 17, 2006, provisional application No. 60/840,274, filed on Aug. 24, 2006.

(51) Int. Cl.
*H04Q 7/20* (2006.01)
(52) U.S. Cl. ........................................ 455/433; 455/411
(58) Field of Classification Search .................. 455/411, 455/432.1, 433, 435.1, 435.2, 456.1, 456.2, 455/456.3
See application file for complete search history.

(56) References Cited

U.S. PATENT DOCUMENTS

| 7,123,928 B2 | 10/2006 | Moeglein et al. |
| 7,383,049 B2 | 6/2008 | Deloach, Jr. et al. |
| 2005/0020309 A1 | 1/2005 | Moeglein et al. |
| 2005/0125493 A1 | 6/2005 | Chaskar et al. |
| 2005/0227689 A1* | 10/2005 | Jewett ........................... 455/433 |
| 2005/0255857 A1* | 11/2005 | Kim et al. .................. 455/456.1 |
| 2006/0036365 A1 | 2/2006 | Chiayee et al. |

FOREIGN PATENT DOCUMENTS

| DE | 10225388 | 1/2004 |
| JP | 2005535901 T | 11/2005 |

(Continued)

OTHER PUBLICATIONS

International Search Report, PCT/US07/076821, International Search Authority, European Patent Office, May 15, 2008.

(Continued)

*Primary Examiner* — Dwayne Bost
*Assistant Examiner* — Myron Wyche
(74) *Attorney, Agent, or Firm* — Andrea L. Mays; Linda G. Gunderson

(57) ABSTRACT

Techniques to support positioning of roaming mobile stations are described. A roaming mobile station communicates with a visited network and has a data connection to a home network. The mobile station sends a request for positioning assistance to a home position determining entity (H-PDE) in the home network. The H-PDE determines that base station almanac (BSA) data applicable for the mobile station is not locally available and sends a request for location information for the mobile station to a designated network entity. This entity may be a BSA server storing BSA data for different networks or a visited PDE (V-PDE) in the visited network. The H-PDE receives location information (e.g., BSA data, assistance data, and/or a position estimate for the mobile station) from the designated network entity and provides positioning assistance to the mobile station based on the received location information.

55 Claims, 11 Drawing Sheets

FOREIGN PATENT DOCUMENTS

| | | |
|---|---|---|
| JP | 2006504284 T | 2/2006 |
| JP | 2007525093 | 8/2007 |
| WO | 2005004527 | 1/2005 |
| WO | 2006029277 | 3/2006 |
| WO | 2006084287 | 8/2006 |

OTHER PUBLICATIONS

Written Opinion, PCTIUS07/076821, International Search Authority, European Patent Office, May 15, 2008.

QUALCOMM Inc., "Location-Based Services V2 Roaming Support (Nonproprietary)," 80-V8470-2NP A, Retrieved From Internet, Jan. 27, 2005, QUALCOMM Inc., San Diego, CA, USA, XP002457174. Retrieved from the Internet: URL:http://www.cdg.org/member_only/teams/GHRC/docs/in_dev/location_based/80-V8470-2NP_A.pdf> [retrieved on Oct. 31, 2007].

International Preliminary Report on Patentability—PCTUS07/076821, International Search Authority—The International Bureau of WIPO—Geneva, Swtizerland—Feb. 24, 2009.

M.V. Ratynsky. Fundamentals of a cellular communication. Under the editorship of D.B. Zimin, second edition, Moscow, publishing house <<Radio and communication>>, 2000, pp. 29-30.

* cited by examiner

METHOD AND APPARATUS FOR SUPPORTING POSITIONING OF ROAMING MOBILE STATIONS

CROSS-REFERENCE TO RELATED APPLICATIONS

The present application claims priority to provisional U.S. Application Ser. No. 60/840,274, entitled "Method and Apparatus to Facilitate Location Based Services Roaming Through Sharing of Base Station Almanac Data," filed Aug. 24, 2006, assigned to the assignee hereof and incorporated herein by reference and to provisional U.S. Application Ser. No. 60/866,410, entitled "CDMA Use Plane Location Based Services (LBS) Roaming filed Nov. 17, 2006, assigned to the assignee hereof and incorporated herein by reference.

BACKGROUND

I. Field

The present disclosure relates generally to communication, and more specifically to techniques for supporting positioning of mobile stations.

II. Background

It is often desirable, and sometimes necessary, to know the location of a mobile station, e.g., a cellular phone. The terms "location" and "position" are synonymous and are used interchangeably herein. For example, a user may utilize the mobile station to browse through a website and may click on location sensitive content. The location of the mobile station may then be determined and used to provide appropriate content to the user. There are many other scenarios in which knowledge of the location of the mobile station is useful or necessary.

The mobile station may be provisioned such that it can obtain location services from a home network and also while roaming in a visited network. The mobile station may communicate with various network entities in the home network in order to determine the location of the mobile station whenever needed. A major challenge is then to provide location services to the mobile station in a roaming scenario.

SUMMARY

Techniques to support positioning and location services for roaming mobile stations are described herein. A roaming mobile station may communicate with a visited network and may have a data connection to a home network. The mobile station may interact with a home position determining entity (H-PDE) in the home network for positioning. The mobile station may send a first request for positioning assistance to the H-PDE. The first request may include system parameter information indicating a serving sector for the mobile station in the visited network. The H-PDE may determine that base station almanac (BSA) data applicable for the mobile station is not locally available in the home network. The H-PDE may then send a second request for location information for the mobile station to a designated network entity and may receive the location information from the designated network entity. The received location information may comprise BSA data, satellite positioning system (SPS) assistance data, and/or a position estimate for the mobile station. The H-PDE may then provide positioning assistance to the mobile station based on the received location information.

The designated network entity may be a BSA server that stores BSA data for multiple networks including the visited network. The BSA server may receive the second request from the H-PDE and may return BSA data for only the serving sector or for the serving sector and neighbor sectors. Alternatively, the designated network entity may be a visited PDE (V-PDE) in the visited network. The V-PDE may receive the second request from the H-PDE and may return BSA data, SPS assistance data, and/or a position estimate for the mobile station.

Various aspects and features of the disclosure are described in further detail below.

DETAILED DESCRIPTION

The techniques described herein may be used for various wireless networks such as Code Division Multiple Access (CDMA) networks, Time Division Multiple Access (TDMA) networks, Frequency Division Multiple Access (FDMA) networks, Orthogonal FDMA (OFDMA) networks, etc. A CDMA network may implement a radio technology such as cdma2000, Wideband-CDMA (W-CDMA), etc. cdma2000 covers IS-2000, IS-856, and IS-95 standards. A TDMA network may implement a radio technology such as Global System for Mobile Communications (GSM), Digital Advanced Mobile Phone System (D-AMPS), etc. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. For clarity, the techniques are described below for 3GPP2 networks.

Figure 1:
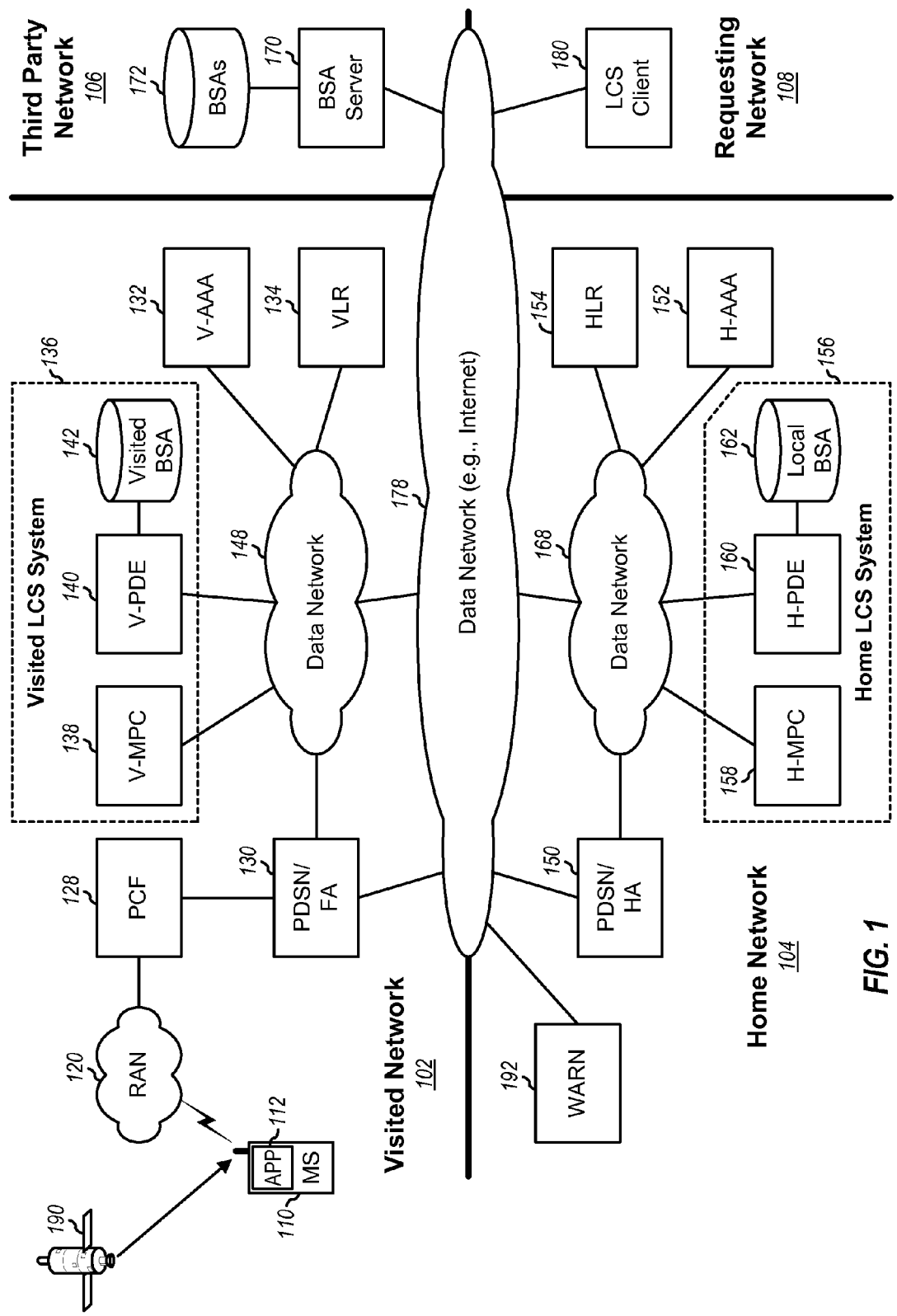
FIG. 1 shows visited and home networks for a roaming mobile station.

FIG. 1 shows a deployment with a visited network 102, a home network 104, a third party network 106, and a requesting network 108. The terms "visited" and "serving" are often used interchangeably. Home network 104 is a wireless network with which a mobile station (MS) 110 has a service subscription. Visited network 102 is a wireless network currently serving mobile station 110. Visited network 102 and home network 104 may be different networks if mobile station 110 is roaming outside the coverage of the home network. Networks 102 and 104 support location services (LCS), which may include any services based on or related to location information. LCS may also be referred to as location-based services (LBS).

Mobile station 110 may be stationary or mobile and may also be referred to as a user equipment (UE), a terminal, an access terminal, a subscriber unit, a station, etc. Mobile station 110 may be a cellular phone, a personal digital assistant (PDA), a wireless device, a handset, a laptop computer, a telemetry device, a tracking device, etc. Mobile station 110 may communicate with a radio access network (RAN) 120 in visited network 102 to obtain communication services such as voice, video, packet data, broadcast, messaging, etc. Mobile station 110 may also receive signals from one or more satellites 190, which may be part of the United States Global Positioning System (GPS), the European Galileo system, the Russian GLONASS system, or some other satellite positioning system (SPS). Mobile station 110 may measure signals from satellites 190 and/or signals from base stations in RAN 120 and may obtain pseudo-range measurements for the satellites and/or timing measurements for the base stations. The pseudo-range measurements and/or timing measurements may be used to derive a position estimate for mobile station 110 using one or a combination of positioning methods such as assisted GPS (A-GPS), standalone GPS, Advanced Forward Link Trilateration (A-FLT), Enhanced Observed Time Difference (E-OTD), Observed Time Difference Of Arrival (OTDOA), Enhanced Cell ID, Cell ID, etc.

An application (APP) 112 may support location services and/or positioning for mobile station 110 and may comprise an LCS client and/or higher-layer applications. An LCS client is a function or an entity that requests location information for an LCS target. An LCS target is a mobile station whose location is being sought. In general, an LCS client may reside in a network entity or a mobile station or may be external to both.

In visited network 102, RAN 120 supports radio communication for mobile stations located within the coverage of the RAN. RAN 120 may include base stations, base station controllers (BSCs), and/or other network entities that support radio communication. A packet control function (PCF) 128 supports packet data exchanges between RAN 120 and a packet data serving node (PDSN) 130. PDSN 130 supports packet-switched calls for mobile stations and is responsible for the establishment, maintenance, and termination of data sessions. PDSN 130 may be a foreign agent (FA) via which mobile station 110 exchanges packet data when roaming. An inter-working function (IWF) may be used in place of PDSN 130 in some wireless networks, e.g., IS-95 networks.

A visited LCS system 136 supports positioning and location services for visited network 102 and includes a visited mobile positioning center (V-MPC) 138, a visited position determining entity (V-PDE) 140, and a BSA unit 142. V-MPC 138 performs various functions for location services and may support subscriber privacy, authorization, authentication, roaming support, charging/billing, service management, position calculation, etc. V-PDE 140 supports positioning for mobile stations. Positioning refers to a process to measure/compute a geographic position estimate for a target device. A position estimate may also be referred to as a location estimate, a position fix, a fix, etc. V-PDE 140 may exchange messages with mobile stations belonging to visited network 102 for positioning, calculate position estimates, support delivery of assistance data to the mobile stations, perform functions for security, etc. Unit 142 stores a BSA containing information for sectors and base stations in visited network 102, which may be used to assist positioning of mobile stations. A sector can refer to a coverage area of a base station and/or a base station subsystem serving the coverage area.

A visited authentication, authorization, and accounting (V-AAA) server 132 performs authentication and authorization for LCS and other services. A visitor location register (VLR) 134 stores registration information for mobile stations that have registered with visited network 102. The network entities in visited network 102 may communicate with one another via a data network 148.

In home network 104, a PDSN 150 may be a home agent (HA) with which mobile station 110 has registered and may be responsible for forwarding packets to mobile station 110. A home LCS system 156 supports positioning and location services for home network 104 and includes a home MPC (H-MPC) 158, a home PDE (H-PDE) 160, and a BSA unit 162, which may operate in similar manner as the corresponding network entities in visited LCS system 136. A home AAA (H-AAA) server 152 and a home location register (HLR) 154 may operate in similar manner as the corresponding network entities in visited network 102. The network entities in home network 104 serve mobile stations communicating with the home network and may communicate with one another via a data network 168.

Third party network 106 includes a BSA server 170 that communicates with the PDEs in other networks to support positioning of mobile stations, as described below. A unit 172 may store BSAs from networks desiring to share BSA data. Requesting network 108 includes an LCS client 180 that may desire to know the location of mobile station 110. LCS client 180 may communicate with H-MPC 158 to obtain the location of mobile station 110. Requesting network 108 may be part of visited network 102 or home network 104 or may be separate from these networks. For example, requesting network 108 may be a data network maintained by an Internet service provider (ISP). The entities in third party network 106 and requesting network 108 may communicate with the entities in visited network 102 and home network 104 via a data network 178, which may be the Internet or some other network.

A Wide Area Reference Network (WARN) 192 monitors GPS satellites and may provide H-PDE 160 with satellite reference information for the coverage areas of home network 104 and visited network 102. The satellite reference information may comprise differential correction for GPS Ephemeris information and may be used in GPS and A-GPS location calculations.

FIG. 1 shows an example of visited network 102 and home network 104. In general, a network may include any combination of entities that may support any services offered by the network. Networks 102 and 104 may support a user plane location architecture. A user plane is a mechanism for carrying messages/signaling for higher-layer applications and employs a user-plane bearer, which is typically implemented with protocols such as User Datagram Protocol (UDP), Transmission Control Protocol (TCP), and Internet Protocol (IP), all of which are known in the art. Messages/signaling supporting location services and positioning may be carried as part of data (from a network perspective) in a user plane architecture.

Networks 102 and 104 may implement any user plane architecture such as V1 or V2 user plane from CDMA Development Group (CDG), X.S0024 user plane from 3GPP2, Secure User Plane Location (SUPL) from Open Mobile Alliance (OMA), etc. V1, V2 and X.S0024 are applicable for 3GPP2 networks. SUPL is applicable for 3GPP and 3GPP2 networks. These user plane architectures are described in publicly available documents.

In the description herein, the term "PDE" generically refers to an entity that supports positioning, the term "MPC" generically refers to an entity that supports location services, the term "mobile station" generically refers to an entity that may communicate with an MPC for location services and/or a PDE for positioning, and the term "LCS client" generically refers to an entity that requests the location of a mobile station. A PDE may be a PDE in V1 and V2 user plane, a SUPL Positioning Center (SPC) in SUPL, a Serving Mobile Location Center (SMLC) or a Standalone SMLC (SAS) in 3GPP, etc. An MPC may be an MPC in V1 and V2 user plane, a SUPL Location Center (SLC) in SUPL, a Position Server (PS) in X.S0024, a Gateway Mobile Location Center (GMLC) in 3GPP, etc. A mobile station may be a mobile station in V1 and V2 user plane, a SUPL enabled terminal (SET) in SUPL, a UE in 3GPP, etc. The PDE, MPC, mobile station, and LCS client may also be referred to by other names in other networks and other location architectures.

Networks 102 and 104 may support location services for roaming mobile stations based on trusted and/or non-trusted models. Table 1 gives short descriptions for the trusted and non-trusted models.

TABLE 1

| Model | Description |
| --- | --- |
| Trusted | Assume that LCS applications can be trusted (e.g., authorized or authenticated via separate mechanisms) and can access PDEs directly. |
| Non-trusted | May perform service authorization for LCS applications prior to providing location services. LCS applications go through MPCs to access PDEs. |

A network may maintain a BSA for sectors and/or base stations in that network. The BSA may contain a number of records, and each BSA record may describe a sector or a base station in the network. Each BSA record may contain various types of information that may be pertinent for positioning. For example, a BSA record may contain information for sector/base station identifier, base station antenna position, antenna parameters, terrain information, sector center, frequency, and so on, as described in U.S. Pat. No. 7,123,928. The BSA may be used to support network-based positioning methods such as A-FLT, E-OTD, OTDOA, Enhanced Cell ID, Cell ID, etc. For example, the base station position may be used for triangulation of the mobile station position using the A-FLT, E-OTD, and OTDOA methods. The sector center may be used as a coarse position estimate for the mobile station for the Enhanced Cell ID and Cell ID methods. The BSA may also be used to support satellite-based positioning methods such as GPS, A-GPS, etc. For example, information for the serving sector of mobile station 110 may be used to obtain a coarse position estimate, which may in turn be used to provide appropriate GPS assistance data to the mobile station.

Mobile station 110 may communicate with visited network 102 and may receive a request for the location of the mobile station, e.g., from an application resident on the mobile station, LCS client 180, or H-MPC 158. Even while roaming, mobile station 110 may have a data connection to home network 104 using a data roaming mechanism such as Mobile IP. It may be desirable to serve roaming mobile station 110 from home LCS system 156. This may allow home network 104 to retain control over security and authentication, user privacy, quality of position estimates, system scaling, billing, etc. Furthermore, this may allow mobile station 110 to obtain location services from home network 104 while roaming anywhere, regardless of the positioning and LCS capabilities of the visited networks, as long as voice and data roaming is supported for the mobile station.

To effectively serve mobile station 110 when roaming, home LCS system 156 may need access to BSA data from visited network 102. Unit 162 in home LCS system 156 may store BSA data for only sectors and base stations in home network 104. Unit 142 in visited LCS system 156 may store BSA data for sectors and base stations in visited network 102. Home LCS system 156 may need access to the BSA data stored in visited LCS system 136 in order to effectively serve mobile station 110 when roaming in visited network 102.

In an aspect, BSA server 170 supports sharing of BSA data from different participating networks for positioning of mobile stations roaming in these networks. BSA server 170 may receive BSAs from different networks such as visited network 102 and home network 104 and may store these BSAs in unit 172. Each network may provide its BSA to BSA server 170 on a periodic basis, whenever the BSA is updated, as requested by the BSA server, etc. BSA server 170 may operate as a repository for the BSAs from the participating networks and may provide BSA data to authorized PDEs when and as requested by these PDEs. If a given PDE does not have the necessary content in its local BSA to serve a roaming mobile station, then the PDE may query BSA server 170 for the desired BSA data. The PDE may be able to effectively serve the mobile station (e.g., derive a high quality position estimate) based on the BSA data provided by BSA server 170.

Figure 2:
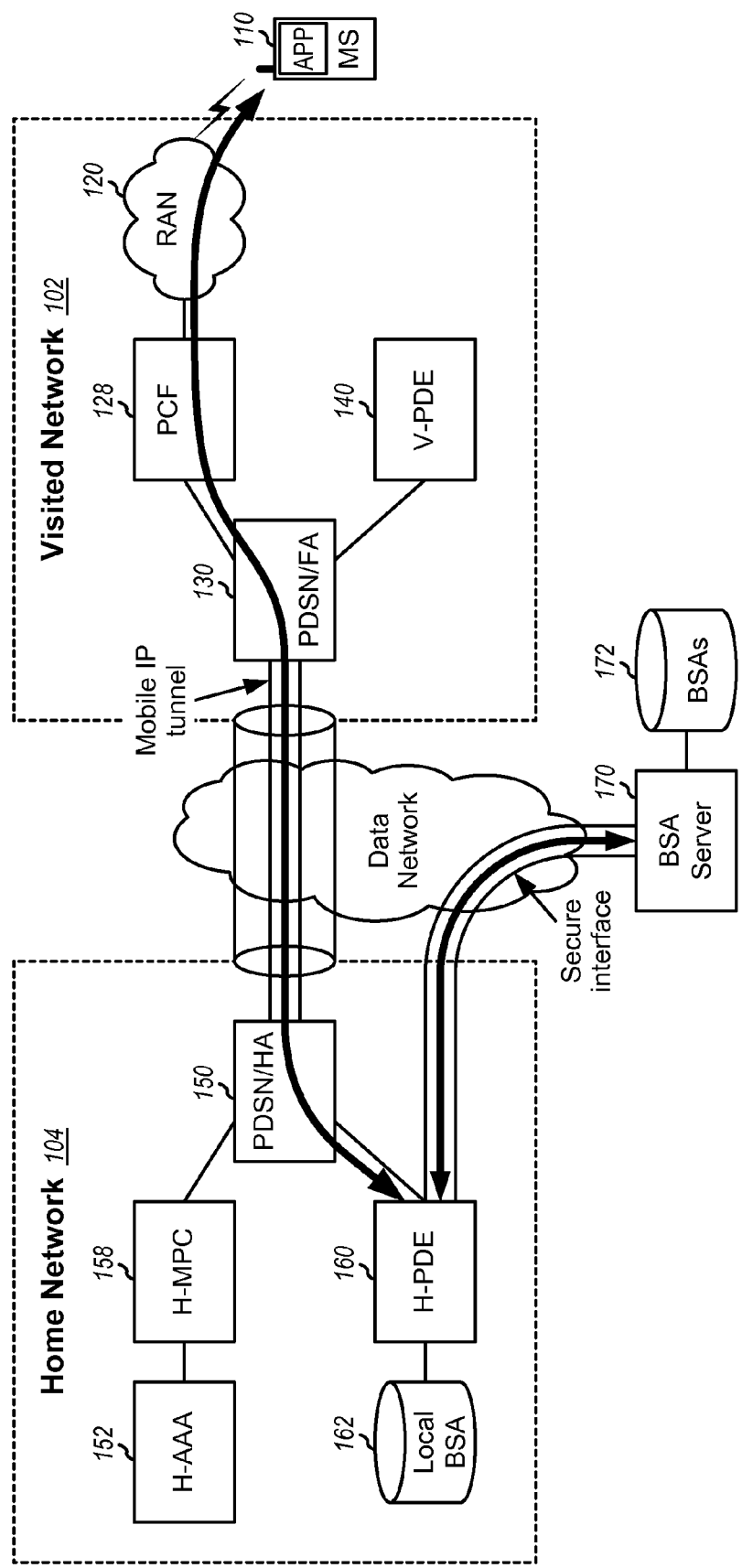
FIG. 2 shows positioning of the roaming mobile station using a BSA server.

FIG. 2 shows a design to support positioning of roaming mobile station 110 using BSA server 170. Mobile station 110 may exchange data with PDSN/HA 150 in home network 104 via RAN 120, PCF 128 and PDSN/FA 130 in visited network 102 using a roaming mechanism such as Mobile IP. A Mobile IP tunnel may be established between PDSN/FA 130 and PDSN/HA 150 and used to exchange data for mobile station 110. The network entities in visited network 102 may transparently transfer data for the communication between mobile station 110 and home network 104. Mobile station 110 may communicate with the entities in home LCS system 156 via PDSN/HA 150.

Mobile station 110 may communicate with H-MPC 158 for location service (e.g., to request for assistance data or a position estimate) and may provide system parameter information for a serving sector for the mobile station. For IS-801, the system parameter information may comprise System Identification (SID), Network Identification (NID), and Base Station Identification (BASE_ID), all of which may be obtained from a System Parameter message broadcast by the serving sector. The SID identifies a cellular system of a network operator in a specific region, and the NID identifies a smaller network within the cellular system. The BASE_ID may be composed of a CELL_ID and a SECTOR_ID assigned to the serving sector. The SID and NID may be used to identify the network currently serving mobile station 110 and to determine whether mobile station 110 is roaming. The SID, NID and BASE_ID may be used to determine the sector currently serving mobile station 110. For GSM, the system parameter information may comprise a Mobile Country Code (MCC), a Mobile Network Code (MNC), and a Location Area Code (LAC). For W-CDMA, the system parameter information may comprise an MCC, an MNC, and a Radio Network Controller identifier (RNC-ID). The system parameter information may comprise other items in other systems. Mobile station 110 may also provide other information such as positioning quality of service (PQoS) information, the desired number of position estimates, etc.

H-MPC 158 may authorize mobile station 110 for the requested location service and may select H-PDE 160 to serve the mobile station for positioning. H-MPC 158 may request H-PDE 160 to accept a positioning session with mobile station 110 and may provide pertinent information received from mobile station 110 to H-PDE 160.

Mobile station 110 and H-PDE 160 may then perform a positioning session (e.g., an IS-801 session) to provide positioning assistance to mobile station 110. H-PDE 160 may receive the SID, NID and BASE_ID for mobile station 110 from H-MPC 158 and may determine that mobile station 110 is currently roaming. H-PDE 160 may recognize that the desired BSA data is not locally available in unit 162 and may then request BSA server 170 to provide the desired BSA data. H-PDE 160 may communicate with BSA server 170 via a secured interface, which may be over the Internet using tunneling or other means. The secured interface may prevent BSA data from being read by anyone (including network operators) while in transit. BSA server 170 may respond to the request from H-PDE 160 by returning BSA data for the serving sector of mobile station 110. BSA server 170 may also provide BSA data for neighbor sectors, which may be useful if mobile station 110 is handed off to any of these neighbor sectors. H-PDE 160 may use the BSA data received from BSA server 170 to provide appropriate assistance data to mobile station 110. Alternatively, H-PDE 160 may use the BSA data to derive a position estimate for mobile station 110 and may provide the position estimate to the mobile station. H-PDE 160 may provide positioning assistance to mobile station 110 based on the BSA data received from BSA server 170 and the satellite reference information received from WARN 192 for the area in which mobile station 110 is currently located.

Figure 3:
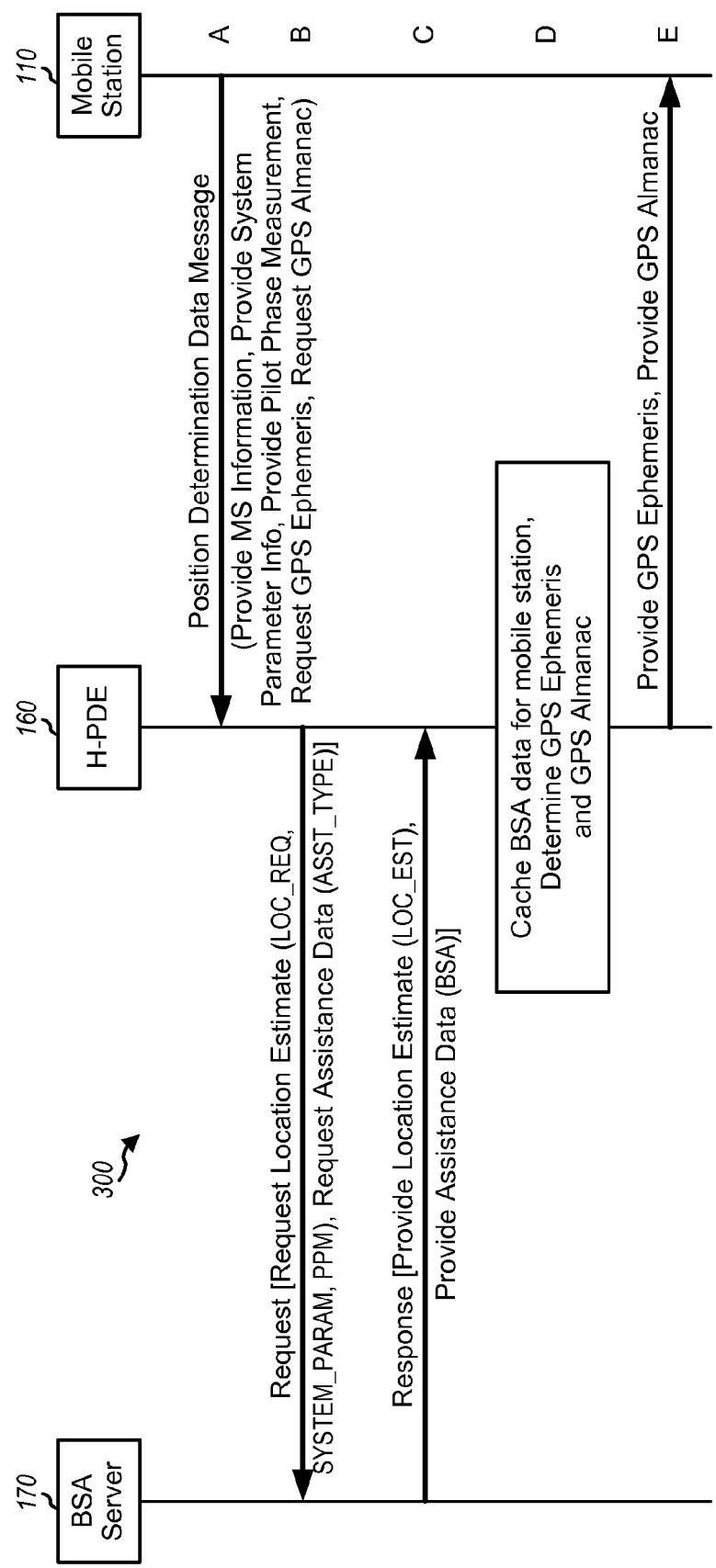
FIGS. 3 and 4 show two message flows for positioning of the roaming mobile station using the BSA server.

FIG. 3 shows a design of a message flow 300 to support positioning of roaming mobile station 110 using BSA server 170. Mobile station 110 may send an IS-801 Position Determination Data Message to H-PDE 160 (step A). This message may include (i) a Provide MS Information element indicating positioning capabilities of mobile station 110, (ii) a Provide System Parameter Information element containing system parameter information such as the SID, NID and BASE_ID, (iii) a Provide Pilot Phase Measurement element containing pilot timing and/or signal strength measurements made by mobile station 110 for detected sectors, (iv) a Request GPS Ephemeris element to request for GPS Ephemeris, and (v) a Request GPS Almanac element to request for GPS Almanac. The GPS Almanac includes information regarding coarse locations of all satellites in the GPS constellation. The GPS Ephemeris includes a higher accuracy version of a GPS satellite orbit, as tracked and reported by tracking stations on earth.

H-PDE 160 may receive the Position Determination Data Message from mobile station 110 and may determine that the mobile station is roaming based on the system parameter information. H-PDE 160 may then send a Request message containing a Request Location Estimate element and a Request Assistance Data element to BSA server 170 (step B). The Request Location Estimate element may include a LOC_REQ parameter containing different types of information being requested (e.g., height, GPS clock correct, velocity, etc.), a SYSTEM_PARAM parameter containing the system parameter information, and a PPM parameter containing pilot information (e.g., pilot PN phase, pilot strength, etc.). The Request Assistance Data element may include an ASST_TYPE parameter indicating the type of assistance data being requested, which in this case is BSA. The various messages, elements, and parameters are described in 3GPP2 C.S0022, entitled "Position Determination Service Standard for Dual Mode Spread Spectrum Systems," Feb. 16, 2001, which covers IS-801 and is publicly available.

BSA server 170 may receive the Request message from H-PDE 160 and may return a Response message containing a Provide Location Estimate element and a Provide Assistance Data element (step C). The Provide Location Estimate element may include a LOC_EST parameter containing a coarse position estimate. The Provide Assistance Data element may include a BSA parameter containing BSA data for mobile station 110. H-PDE 160 may cache the BSA data and determine appropriate GPS Ephemeris and GPS Almanac for mobile station 110 based on the BSA data (step D). H-PDE 160 may then provide the requested GPS Ephemeris and GPS Almanac to mobile station 110 (step E).

Figure 4:
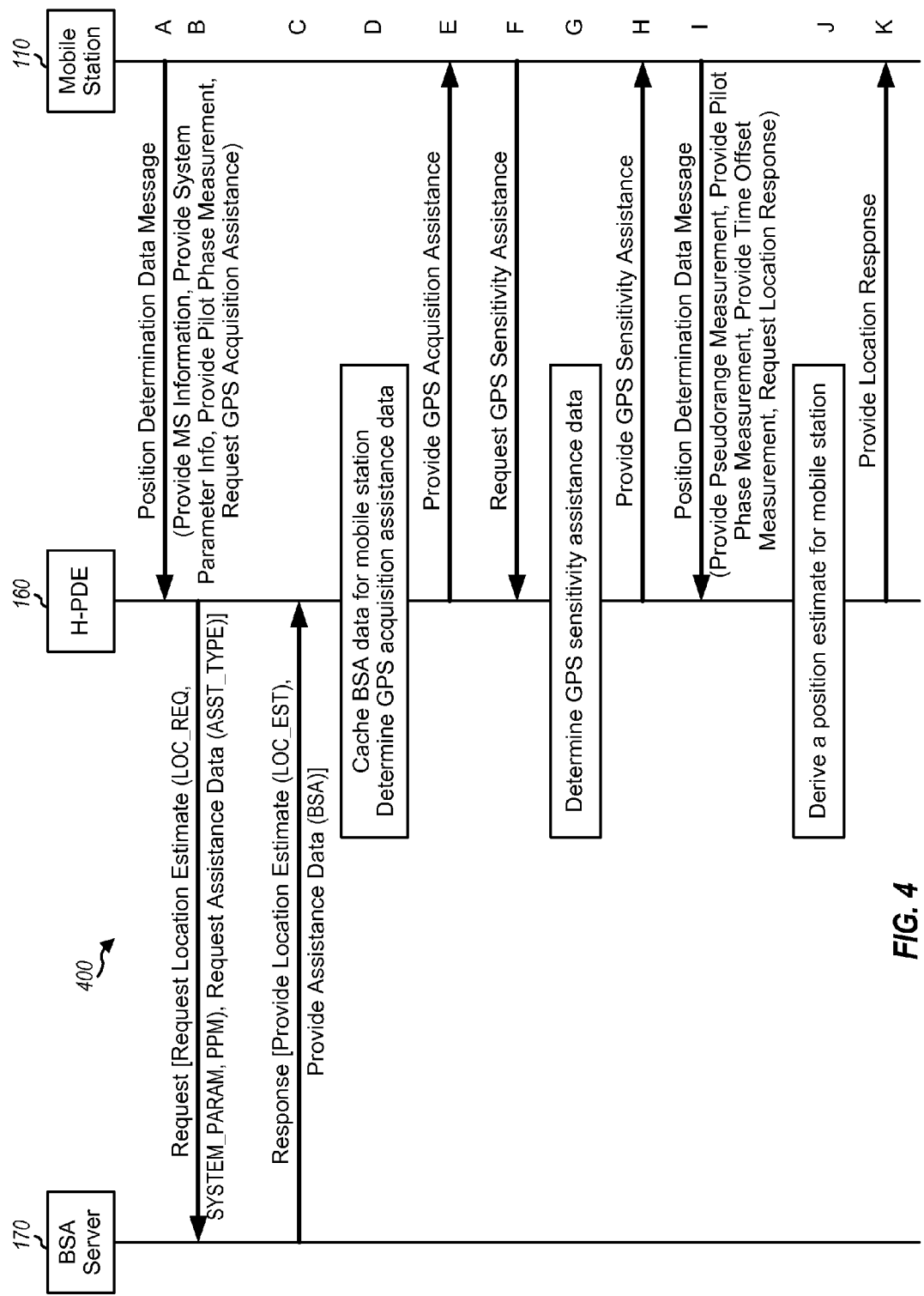

FIG. 4 shows a design of a message flow 400 to support positioning of roaming mobile station 110 using BSA server 170. Mobile station 110 may send to H-PDE 160 an IS-801 Position Determination Data Message containing an MS Information element, a System Parameter Information element, a Provide Pilot Phase Measurement element, and a Request GPS Acquisition Assistance element to request GPS acquisition assistance (step A). H-PDE 160 may determine that mobile station 110 is roaming and may then send a Request message containing a Request Location Estimate element and a Request Assistance Data element to BSA server 170 (step B). The Request Assistance Data element may include an ASST_TYPE parameter indicating that BSA data is being requested. BSA server 170 may return a Response message containing a Provide Location Estimate element and a Provide Assistance Data element (step C). The Provide Assistance Data element may include a BSA parameter containing BSA data for mobile station 110. H-PDE 160 may cache the BSA data and determine appropriate GPS acquisition assistance data based on the BSA data (step D). H-PDE 160 may then provide the requested GPS acquisition assistance data to mobile station 110 (step E).

Mobile station 110 may send a request for GPS sensitivity assistance to H-PDE 160 (step F). H-PDE 160 may determine appropriate GPS sensitivity assistance data for mobile station 110 based on the cached BSA data (step G). H-PDE 160 may then provide the requested GPS sensitivity assistance data to mobile station 110 (step H).

Mobile station 110 may provide pseudo-range measurement (PRM), pilot phase measurement, time offset measurement, and a request for location response to H-PDE 160 (step I). H-PDE 160 may derive a position estimate for mobile station 110 based on the cached BSA data and the measurements from mobile station 110 (step J). H-PDE 160 may then return a location response containing the position estimate (step K).

FIGS. 3 and 4 show two example message flows to support positioning of roaming mobile station 110. Other message flows may also be used to support positioning. In general, H-PDE 160 may be requested by mobile station 110 to provide assistance data, to derive a position estimate, etc. H-PDE 160 may query BSA server 170 for pertinent BSA data if this data is not available in the local BSA. H-PDE 160 may then provide the requested assistance data, position estimate, etc. to mobile station 110.

H-PDE 160 may support roaming and non-roaming mobile stations for home network 104. H-PDE 160 may receive a request for positioning assistance from mobile station 110 and may determine whether the desired BSA data is available in the local BSA. H-PDE 160 may make this determination based on system parameter information provided by mobile station 110. In one design, H-PDE 160 may maintain a table of SIDs for which it can request BSA data from BSA server 170. For each request from mobile station 110, H-PDE 160 may compare the SID in the request against those in the table and may query BSA server 170 for BSA data if the SID is not in the table. H-PDE 160 may wait for the requested BSA data to arrive from BSA server 170 and may provide positioning assistance to mobile station 110 based on the BSA data.

H-PDE 160 may cache the BSA data received from BSA server 170 for a limited period of time so that H-PDE 160 can use this BSA data later, if needed, as shown in FIG. 4. H-PDE 160 may discard the cached BSA data after the limited period to avoid using stale BSA data. H-PDE 160 may also obscure any data in any operator-accessible log that may allow important aspects of another network's BSA from being reconstructed. H-PDE 160 may also send information for some or all position estimates to BSA server 170 to allow the BSA server to monitor roaming BSA quality, calculate and report roaming BSA performance, self-learn roaming BSA data, etc.

H-PDE 160 may receive BSA data from BSA server 170 and determine appropriate assistance data for mobile station 110, as shown in FIGS. 3 and 4. The assistance data (e.g., GPS Ephemeris and GPS Almanac) may be dependent on the current position of mobile station 110. H-PDE 160 may receive satellite reference information (e.g., differential correction) from WARN 192 for the home network coverage area as well as all supported roaming areas. H-PDE 160 may apply appropriate differential correction for assistance data depending of the current position of mobile station 110.

In general, BSA server 170 may serve any number of PDEs from any number of networks. BSA server 170 and the PDEs may communicate using any suitable PDE-Server interface such as a query-response type interface, e.g., an IP-based protocol such as TCP/IP or an Inter-PDE LBS Roaming Protocol. BSA server 170 may receive and store BSA data from the PDEs of different network operators. These operators may provide BSA files in any suitable BSA file format such as BSA Format Type 2 described in U.S. Pat. No. 7,123,928, entitled "Method and Apparatus for Creating and Using a Base Station Almanac for Position Determination," issued Oct. 17, 2006. BSA server 170 may support web-based operator access portal, automated secure FTP file transfer of BSA files, direct query of BSA over the PDE-Server interface, etc.

BSA server 170 may control the sharing of BSA data among different participating networks. BSA server 170 may be operated by an independent third party and may be instructed by the network operators how their BSA data should be shared. The sharing of the BSA data among the different operators may be dependent on business agreements between these operators. For example, BSA server 170 may receive BSAs of four networks A, B, C and D. BSA server 170 may allow network A to have access to only the BSA of network C, allow network B to have access to the BSAs of networks C and D, allow network C to have access to the BSAs of networks A, B and D, and allow network D to have access to the BSAs of networks B and C. BSA server 170 may thus control which networks can receive BSA data from which other networks.

The sharing of the BSA data among the different networks may also be dependent on regulatory measures. For example, network A may have access to only the BSA of network C for normal operation but may have access to the BSAs of all networks for emergency calls.

BSA server 170 may allow a given network to have access to all or only a portion of the BSA of another network. For the example above, BSA server 170 may allow network B to receive BSA data for only a limited portion of the service territory of network C and for the entire service territory of network D.

BSA server 170 may also provide BSA content filtering. For example, BSA server 170 may provide either unmodified full-quality BSA data or degraded BSA data in response to a request from a PDE. BSA data may be degraded, e.g., by providing sector center or base station position with larger uncertainty. BSA server 170 may provide BSA data for only a serving sector indicated in a PDE request or for the serving sector and neighbor sectors. The BSA data for the neighbor sectors, if provided, may be of full quality or may be degraded to make it less valuable or to mask its content.

In another aspect, the PDEs may communicate with one another to provide location information for roaming mobile stations. In general, location information may be any information used for positioning of a mobile station and may comprise BSA data, any type of assistance data, a position estimate, etc. In one design, a PDE may maintain a table of SIDs for which the PDE can request location information and the addresses of the PDEs from which to request the location information. Upon receiving a location request from a mobile station, the PDE may compare the SID in the location request against those in the table and, if the SID is in the table, may request for location information for the mobile station from an appropriate PDE.

Figure 5:
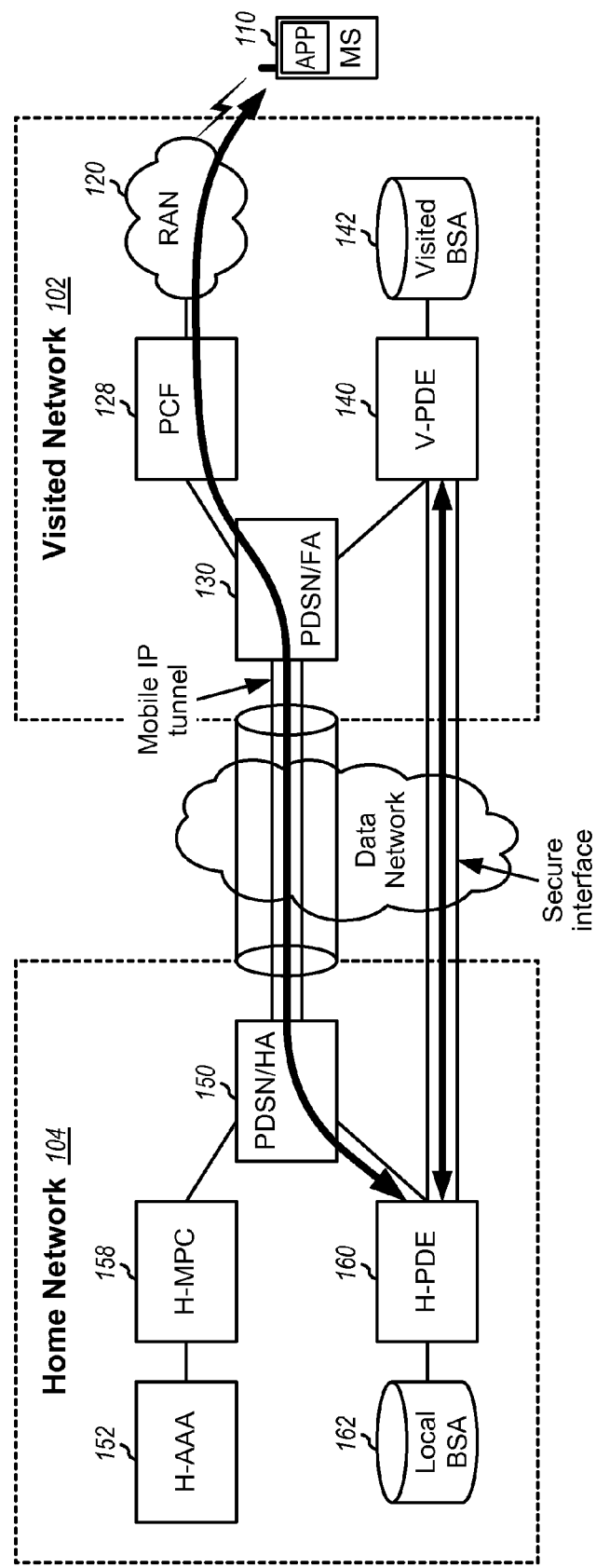
FIG. 5 shows positioning of the roaming mobile station using a V-PDE.

FIG. 5 shows a design to support positioning of roaming mobile station 110 using V-PDE 140. Mobile station 110 may communicate with H-PDE 160 in home network 104 via visited network 102, as described above for FIG. 2. Mobile station 110 may communicate with H-MPC 158 for location service and may provide system parameter information (e.g., SID, NID, and BASE_ID) for the serving sector. H-MPC 158 may authorize mobile station 110 for the requested location service, select H-PDE 160 to serve mobile station, and request H-PDE 160 to accept a positioning session for mobile station 110.

Mobile station 110 and H-PDE 160 may then perform a positioning session (e.g., an IS-801 session) for positioning of mobile station 110. H-PDE 160 may receive the SID, NID, and BASE_ID for mobile station 110 from H-MPC 158 and may determine that mobile station 110 is roaming. H-PDE 160 may recognize that the desired BSA data is not locally available and may determine that V-PDE 140 can provide location information for mobile station 110. H-PDE 160 may then query V-PDE 140 to provide location information for mobile station 110. H-PDE 160 may communicate with V-PDE 140 via a secured interface to prevent interception of the location information while in transit. V-PDE 140 may respond to the query from H-PDE 160 by returning the requested location information for mobile station 110.

In one design, V-PDE 140 may provide BSA data for the serving sector and possibly neighbor sectors. H-PDE 160 may determine appropriate assistance data for mobile station 110, if requested, based on the received BSA data and may then provide the assistance data to the mobile station. If a position estimate is requested, then H-PDE 160 may derive a position estimate for mobile station 110 based on the received BSA data from V-PDE 140 and may then provide the position estimate to the mobile station. In another design, V-PDE 140 may receive measurements sent by mobile station 110 and forwarded by H-PDE 160 and may provide either assistance data or a position estimate for mobile station 110. H-PDE 160 may then forward the assistance data or position estimate to mobile station 110. In this design, V-PDE 140 can avoid sending BSA data to H-PDE 160, which may be desirable since the BSA data can be considered as proprietary information for the network operator.

Figure 6:
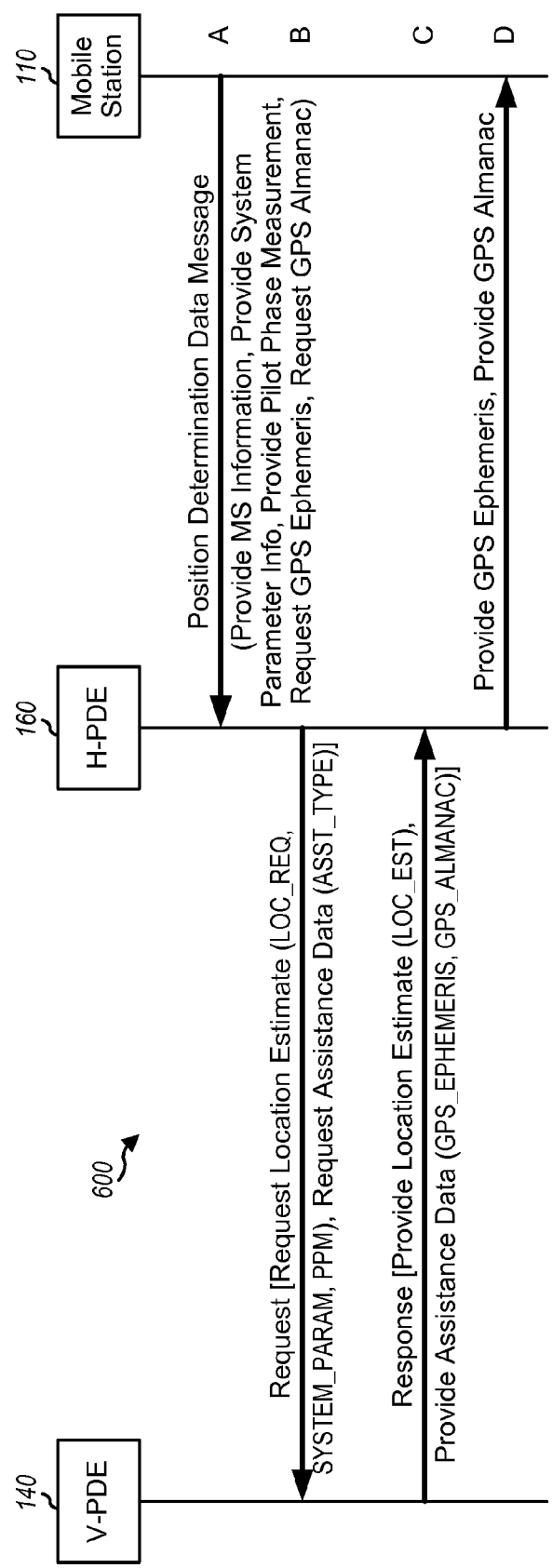
FIGS. 6 and 7 show two message flows for positioning of the roaming mobile station using the V-PDE.

FIG. 6 shows a design of a message flow 600 to support positioning of roaming mobile station 110 using V-PDE 140. Mobile station 110 may send to H-PDE 160 an IS-801 Position Determination Data Message containing various information elements including requests for GPS Ephemeris and GPS Almanac (step A). H-PDE 160 may determine that mobile station 110 is roaming and may then send a Request message to V-PDE 140 (step B). V-PDE 140 may return a Response message containing a Provide Location Estimate element and a Provide Assistance Data element (step C). The Provide Location Estimate element may include a LOC_EST parameter containing a coarse position estimate. The Provide Assistance Data element may include a GPS_EPHEMERIS parameter containing GPS Ephemeris and a GPS_ALMA-NAC parameter containing GPS Almanac. H-PDE 160 may then provide the requested GPS Ephemeris and GPS Almanac to mobile station 110 (step D).

Figure 7:
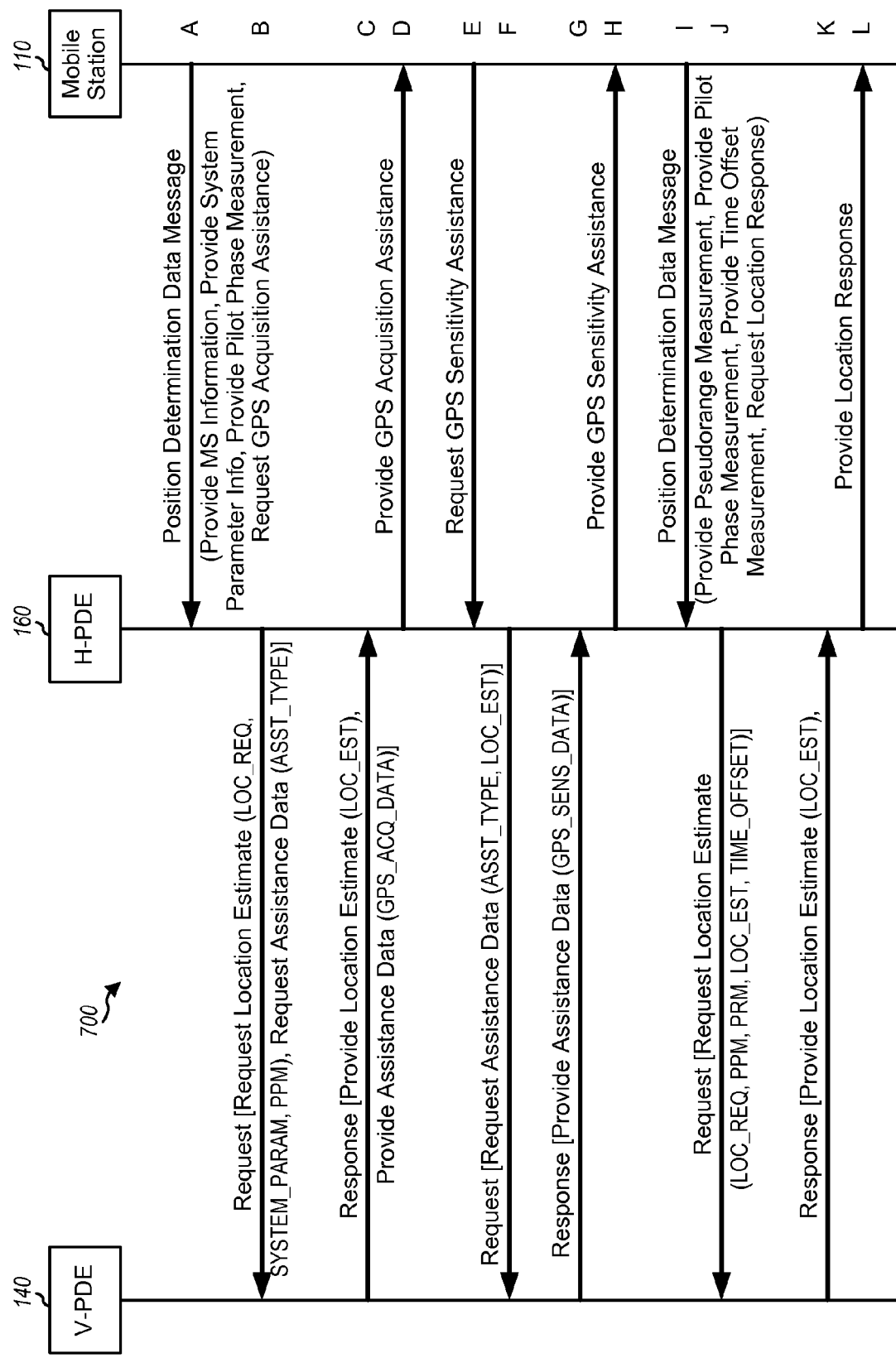

FIG. 7 shows a design of a message flow 700 to support positioning of roaming mobile station 110 using V-PDE 140. Mobile station 110 may send to H-PDE 160 an IS-801 Position Determination Data Message containing various Information elements including a request for GPS acquisition assistance (step A). H-PDE 160 may determine that mobile station 110 is roaming and may then send a Request message to V-PDE 140 (step B). V-PDE 140 may return a Response message containing a Provide Location Estimate element and a Provide Assistance Data element (step C). The Provide Assistance Data element may include a GPS_ACQ_DATA parameter containing GPS acquisition assistance data. H-PDE 160 may then provide the requested GPS acquisition assistance data to mobile station 110 (step D).

Mobile station 110 may send a request for GPS sensitivity assistance to H-PDE 160 (step E). H-PDE 160 may then send a Request message with a Request Assistance Data element to V-PDE 140 (step F). V-PDE 140 may return a Response message with a Provide Assistance Data element, which may include a GPS_SENS_DATA parameter containing GPS sensitivity assistance data (step G). H-PDE 160 may then provide the requested GPS sensitivity assistance data to mobile station 110 (step H).

Mobile station 110 may provide pseudo-range measurement, pilot phase measurement, time offset measurement, and a request for location response to H-PDE 160 (step I). H-PDE 160 may then send to V-PDE 140 a Request message with a Request Location Estimate element containing the information received from mobile station (step J). V-PDE 140 may derive a position estimate for mobile station 110 and may return a Response message with a Provide Location Estimate element containing the position estimate (step K). H-PDE 160 may then send a location response containing the position estimate to mobile station 110 (step L).

FIGS. 6 and 7 show two example message flows to support positioning of roaming mobile station 110 using V-PDE 140. Other message flows may also be used to support positioning. In general, H-PDE 160 may be requested by mobile station 110 for any location information such as BSA data, assistance data, a position estimate, etc. H-PDE 160 may query V-PDE 140 if BSA data for mobile station 110 is not locally available. V-PDE 140 may directly return the location information requested by mobile station 110. Alternatively, H-PDE 160 may process the information received from V-PDE 140 to obtain the location information requested by mobile station 110. In any case, H-PDE 160 may return the requested location information to mobile station 110.

As shown in FIGS. 6 and 7, H-PDE 160 may communicate with V-PDE 140 for transaction-based service. Each set of request sent by H-PDE 160 and response sent by V-PDE 140 may be considered as one transaction. In general, a transaction may be for BSA data, a particular type of assistance data, a coarse position estimate, an accurate position estimate, etc. V-PDE 140 may serve each request independently without having to maintain state information.

In general, H-PDE 160 and V-PDE 140 may communicate using any suitable PDE-PDE interface such as a query-response type interface, e.g., the Inter-PDE LBS Roaming Protocol. V-PDE 140 may implement the functions described above for BSA server 170 in order to support queries from other PDEs. For example, V-PDE 140 may control the sharing of its BSA data or assistance data with PDEs in other networks based on business agreements, regulatory measures, etc. V-PDE 140 may also provide BSA content filtering and may provide full-quality and/or degraded BSA data to requesting PDEs.

In yet another aspect, a PDE may receive and store BSA data for other networks in addition to the BSA data for its network. This may allow the PDE to handle positioning entirely without communication with another PDE or BSA server 170.

In yet another design, positioning of roaming mobile station 110 is supported by forwarding positioning messages (e.g., IS-801 messages) from H-PDE 160 to V-PDE 140. Mobile station 110 may go home to H-PDE 160, as described above, regardless of its current location. H-PDE 160 may determine that mobile station 110 is roaming, e.g., based on the SID and NID provided by mobile station 110. H-PDE 160 may then forward positioning messages to an appropriate V-PDE what can serve mobile station 110 for positioning.

Figure 8:
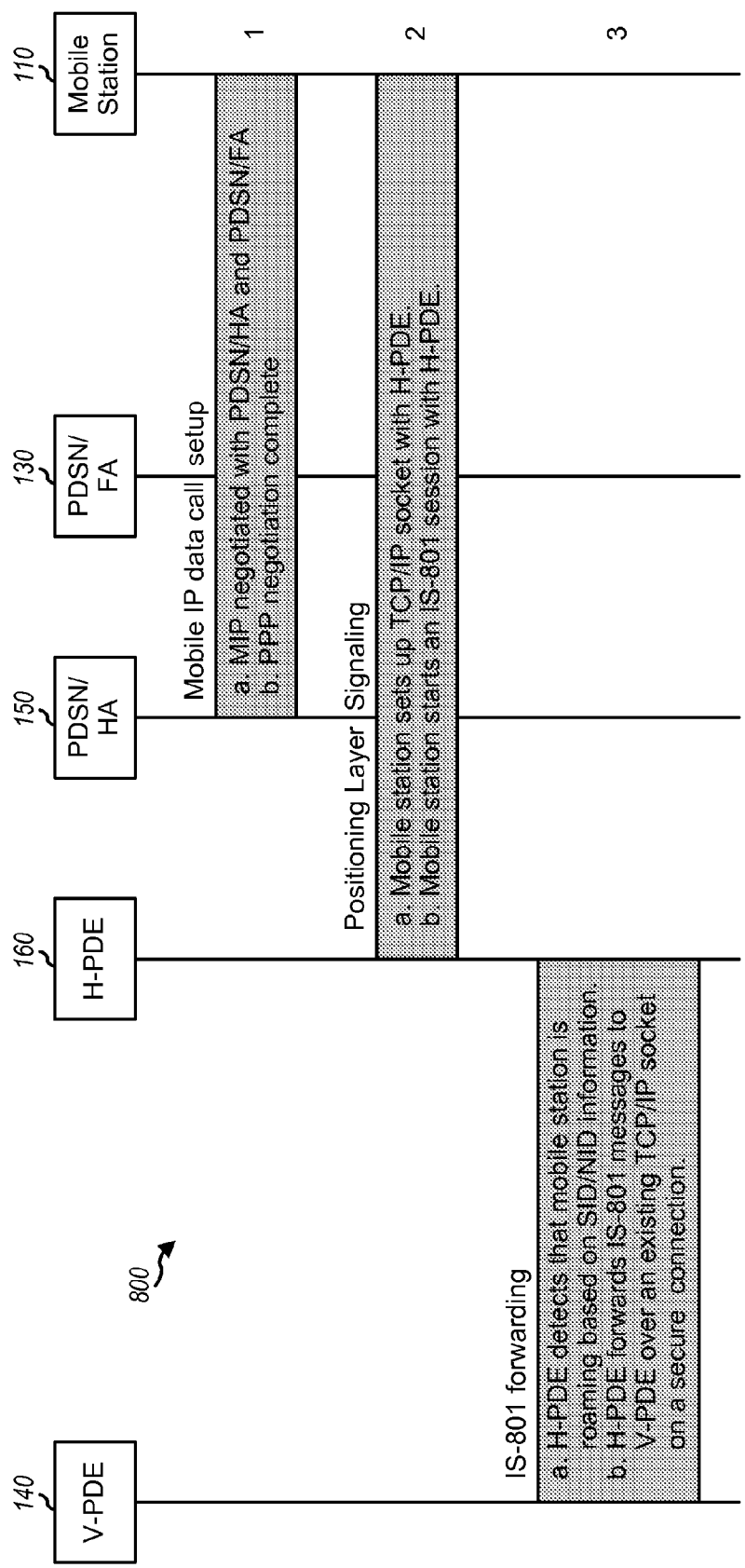
FIG. 8 shows a message flow for positioning of the roaming mobile station with IS-801 message forwarding.

FIG. 8 shows a design of a message flow 800 to support positioning of roaming mobile station 110 using IS-801 message forwarding. Initially, mobile station 110 may perform Mobile IP data call setup to set up a data session with PDSN/HA 150. This call setup may include performing Mobile IP negotiation and PPP negotiation with PDSN/HA 150 in home network 104 and PDSN/FA 130 in visited network 102. Mobile station 110 may thereafter exchange signaling with H-PDE 160 for positioning layer. This may include setting up a TCP/IP socket with H-PDE 160 and starting an IS-801 session with the H-PDE.

Thereafter, mobile station 110 may exchange IS-801 messages with H-PDE 160, which may detect that mobile station 110 is roaming based on the SID and NID provided by the mobile station. H-PDE 160 may then forward IS-801 messages exchanged between mobile station 110 and V-PDE 140, e.g., over a non-persistent TCP/IP socket on a secure connection between the H-PDE and V-PDE.

Figures 9, 10:
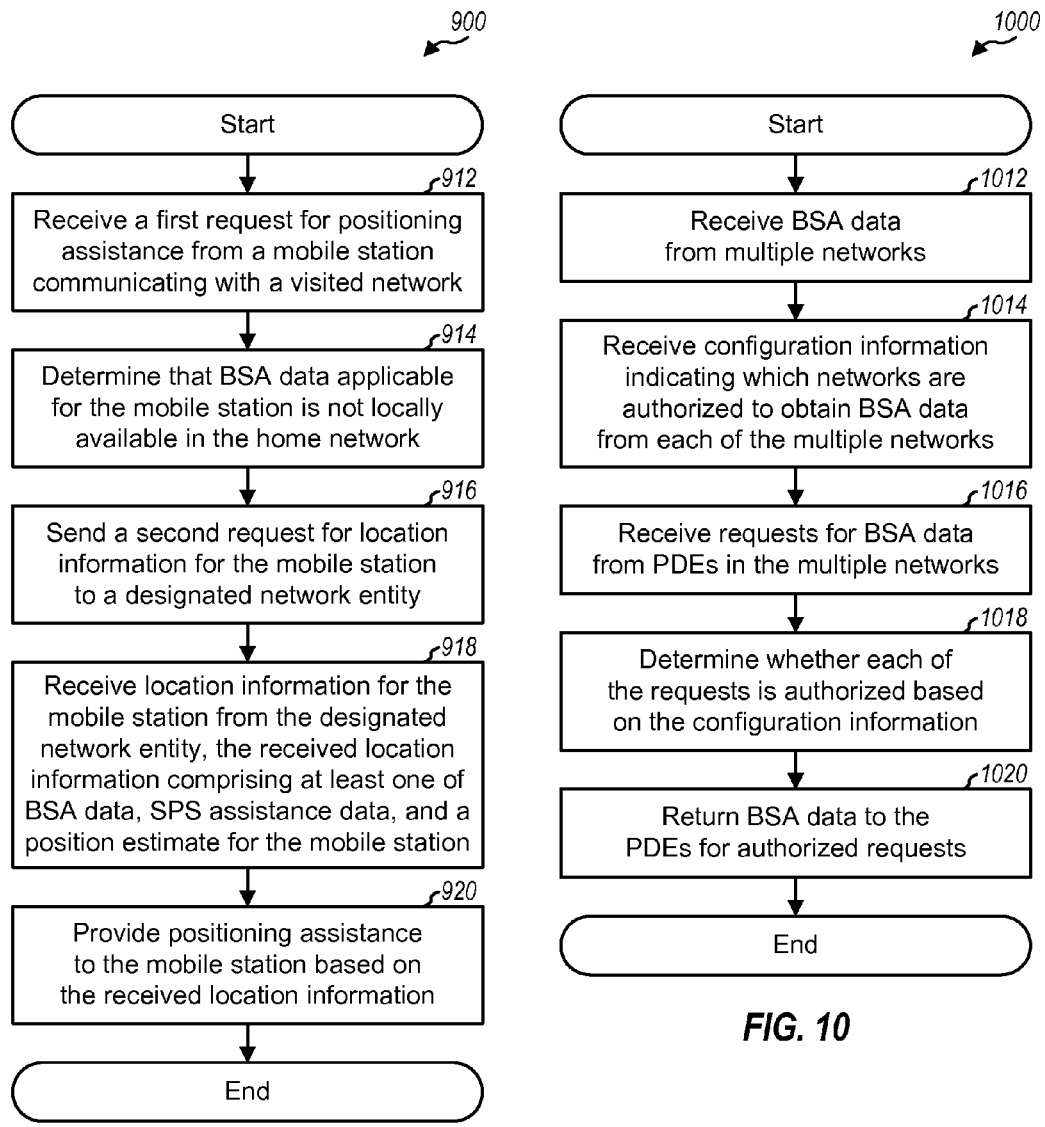
FIG. 9 shows a process performed by the H-PDE.
FIG. 10 shows a process performed by the BSA server.

FIG. 9 shows a design of a process 900 performed by an H-PDE to support positioning of mobile stations. The H-PDE may be any network entity that supports positioning for a home network. The H-PDE may receive a first request for positioning assistance from a mobile station communicating with a visited network (block 912). The H-PDE may determine that BSA data applicable for the mobile station is not locally available in the home network (block 914). The H-PDE may send a second request for location information for the mobile station to a designated network entity (block 916). The H-PDE may receive location information for the mobile station from the designated network entity (block 918). The received location information may comprise BSA data, SPS assistance data, and/or a position estimate for the mobile station. The H-PDE may then provide positioning assistance to the mobile station based on the received location information (block 920).

The H-PDE may receive system parameter information in the first request from the mobile station. The system parameter information may comprise the SID and NID of the visited network. The H-PDE may determine that the BSA data for the mobile station is not locally available based on the system parameter information.

The designated network entity may be a BSA server that stores BSA data for multiple networks including the visited network. The H-PDE may store a table of SIDs for which BSA data is available from the BSA server. The H-PDE may determine that the BSA data for the mobile station is not locally available based on this table of SIDs. The H-PDE may then send the second request for BSA data for the mobile station to the BSA server.

The designated network entity may be a V-PDE for the visited network. The H-PDE may store a table of SIDs for which BSA data is unavailable and the PDEs from which location information is attainable. The H-PDE may determine that the BSA data for the mobile station is not locally available based on this table and may also determine the V-PDE to send the second request based on the table. The H-PDE may send the second request to the V-PDE, which may return BSA data, assistance data, and/or a position estimate for the mobile station, e.g., as shown in FIGS. 6 and 7. The H-PDE may also forward the first request as the second request to the V-PDE and may forward the location information received from the V-PDE to the mobile station, e.g., as shown in FIG. 8.

The H-PDE may provide information for a serving sector of the mobile station in the second request. The H-PDE may then receive (i) BSA data for only the serving sector, (ii) BSA data for the serving sector and at least one neighbor sector, (iii) SPS assistance data for the mobile station, and/or (iv) some other location information from the designated network entity. The H-PDE may also receive at least one measurement for at least one sector from the mobile station. The H-PDE may send the measurement(s) in the second request, receive a position estimate for the mobile station from the designated network entity, and provide the position estimate to the mobile station. Alternatively, the H-PDE may receive BSA data for the mobile station from the designated network entity, determine a position estimate for the mobile station based on the measurement(s) and the received BSA data, and provide the position estimate to the mobile station.

FIG. 10 shows a design of a process 1000 performed by a BSA server to support positioning of mobile stations. The BSA server may receive BSA data from multiple networks, e.g., periodically or whenever the BSA data is updated by these networks (block 1012). The BSA server may also receive configuration information indicating which networks are authorized to obtain BSA data from each of the multiple networks (block 1014). The BSA server may receive requests for BSA data from PDEs in the multiple networks (block 1014). Each PDE may serve one network and may send requests for BSA data of other networks not served by that PDE. The BSA server may determine whether each PDE request is authorized based on the configuration information (block 1016). The BSA server may return BSA data to the PDEs for authorized requests (block 1018)

For a given PDE request, the BSA server may receive information (e.g., SID, NID and BASE_ID) for a serving sector of a mobile station from a PDE. The BSA server may then determine BSA data applicable for the mobile station based on the information for the serving sector and may return the BSA data to the PDE. The returned BSA data may be for only the serving sector or for the serving sector and neighbor sectors. The BSA server may provide unmodified BSA data (as received from the networks) or degraded BSA data (e.g., sector center or base station position with greater uncertainty) to the PDE based on the configuration information applicable for the PDE.

Figure 11:
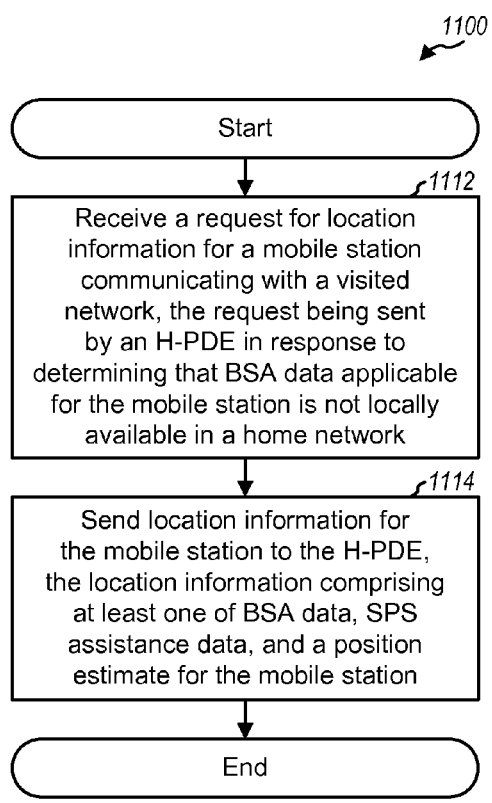
FIG. 11 shows a process performed by the V-PDE.

FIG. 11 shows a design of a process 1100 performed by a V-PDE to support positioning of mobile stations. The V-PDE may be any network entity that supports positioning in a visited network. The V-PDE may receive a request for location information for a mobile station communicating with the visited network (block 1112). The request may be sent by an H-PDE in response to determining that BSA data applicable for the mobile station is not locally available in a home network. The V-PDE may send location information for the mobile station to the H-PDE (block 1114). The location information may comprise BSA data, SPS assistance data, and/or a position estimate for the mobile station. For transaction-based service, the V-PDE may process each request from the H-PDE as a separate transaction. For IS-801 forwarding, the request for location information may be sent by the mobile station to the H-PDE and forwarded by the H-PDE to the V-PDE. The location information may be sent to the H-PDE and forwarded to the mobile station.

Figure 12:
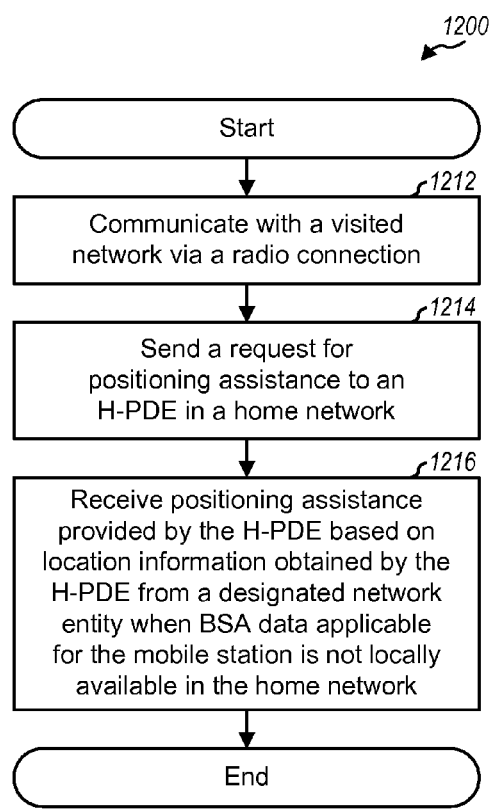
FIG. 12 shows a process performed by the mobile station for positioning.

FIG. 12 shows a design of a process 1200 performed by a mobile station. The mobile station may be roaming and may communicate with a visited network via a radio connection (block 1212). The mobile station may send a request for positioning assistance to an H-PDE in a home network (block 1214). The mobile station may receive positioning assistance provided by the H-PDE based on location information obtained by the H-PDE from a designated network entity when BSA data applicable for the mobile station is not locally available in the home network (block 1216). The mobile station may receive system parameter information from a serving cell in the visited network and may include this information in the request sent to the H-PDE. The H-PDE may use the system parameter information to determine that BSA data for the mobile station is not locally available. The H-PDE may provide BSA data, SPS assistance data, and/or a position estimate to the mobile station, as described above.

Figure 13:
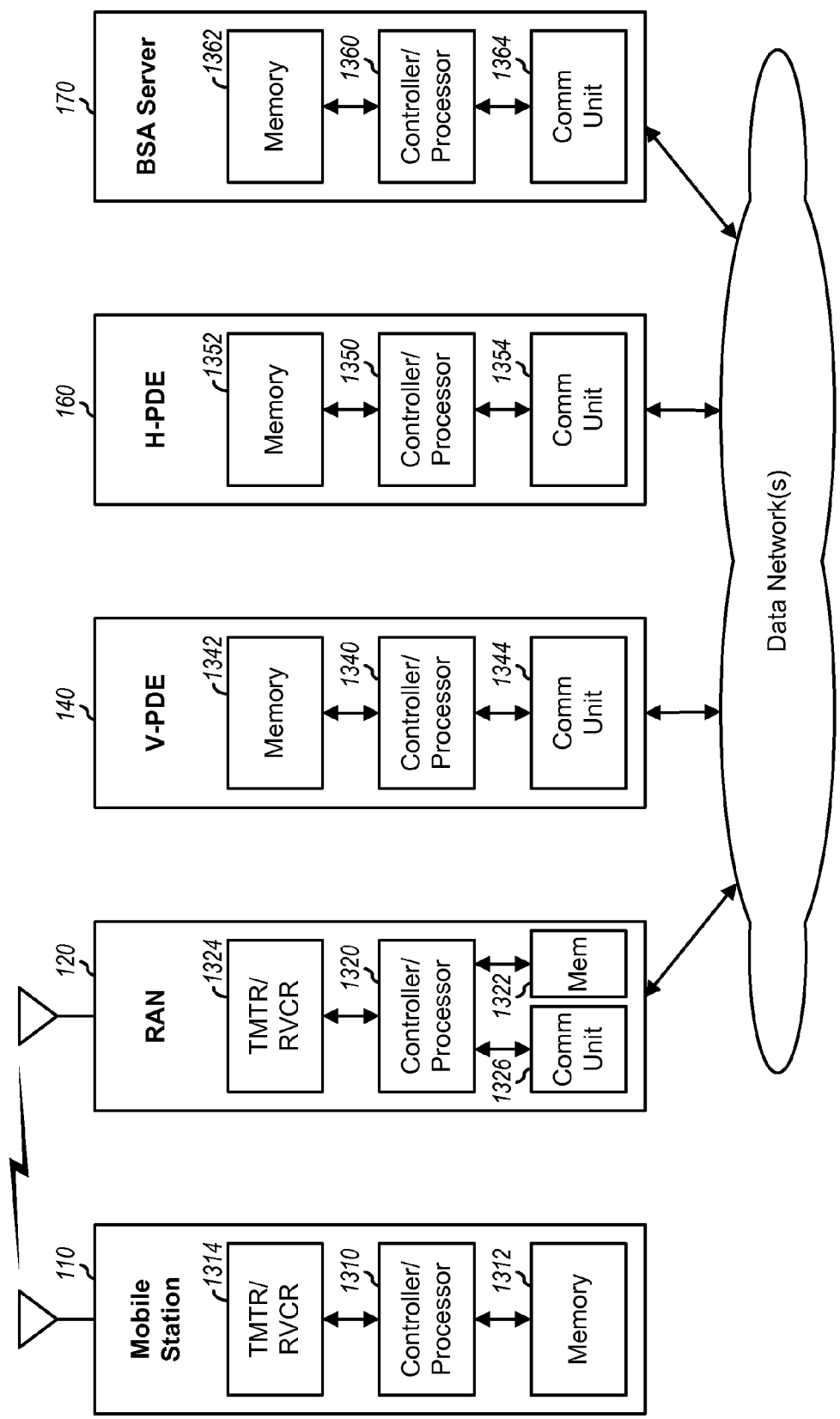
FIG. 13 shows a block diagram of the mobile station and other network entities.

FIG. 13 shows a block diagram of mobile station 110, RAN 120, V-PDE 140, H-PDE 160, and BSA server 170. For simplicity, FIG. 13 shows (i) one controller/processor 1310, one memory 1312, and one transmitter/receiver (TMTR/RCVR) 1314 for mobile station 110, (ii) one controller/processor 1320, one memory 1322, one transmitter/receiver 1324, and one communication (Comm) unit 1326 for RAN 120, (iii) one controller/processor 1340, one memory 1342, and one communication unit 1344 for V-PDE 140, (iv) one controller/processor 1350, one memory 1352, and one communication unit 1354 for H-PDE 160, and (v) one controller/processor 1360, one memory 1362, and one communication unit 1364 for BSA server 170. In general, each entity may include any number of controllers, processors, memories, transceivers, communication units, etc.

On the downlink, base stations in RAN 120 transmit traffic data, messages/signaling, and pilot to mobile stations within their coverage areas. These various types of data are processed by processor 1320 and conditioned by transmitter 1324 to generate a downlink signal, which is transmitted via an antenna. At mobile station 110, the downlink signals from base stations are received via an antenna, conditioned by receiver 1314, and processed by processor 1310 to obtain various types of information for positioning, location and other services. For example, processor 1310 may decode messages used for the message flows described above. Processor 1310 may also perform process 1200 in FIG. 12 for positioning. Memories 1312 and 1322 store program codes and data for mobile station 110 and RAN 120, respectively. On the uplink, mobile station 110 may transmit traffic data, messages/signaling, and pilot to base stations in RAN 120. These various types of data are processed by processor 1310 and conditioned by transmitter 1314 to generate an uplink signal, which is transmitted via the mobile station antenna. At RAN 120, the uplink signals from mobile station 110 and other mobile stations are received and conditioned by receiver 1324 and further processed by processor 1320 to obtain various types of information, e.g., data, messages/signaling, etc. RAN 120 may communicate with other network entities via communication unit 1326.

Within V-PDE 140, processor 1340 performs location and/or positioning processing for the V-PDE, memory 1342 stores program codes and data for the V-PDE, and communication unit 1344 allows the V-PDE to communicate with other entities. Processor 1340 may perform processing for V-PDE 140 in the message flows described above and may also perform process 1100 in FIG. 11. Within H-PDE 160, processor 1350 performs location and/or positioning processing for the H-PDE, memory 1352 stores program codes and data for the H-PDE, and communication unit 1354 allows the H-PDE to communicate with other entities. Processor 1350 may perform processing for H-PDE 160 in the message flows described above and may also perform process 900 in FIG. 9. Within BSA server 170, processor 1360 performs processing for the BSA server, memory 1362 stores program codes and data for the BSA server, and communication unit 1364 allows the BSA server to communicate with other entities. Processor 1360 may perform processing for BSA server 170 in the message flows described above and may also perform process 1000 in FIG. 10.

The techniques described herein may be implemented by various means. For example, these techniques may be implemented in hardware, firmware, software, or a combination thereof. For a hardware implementation, the processing units used to perform the techniques at each entity (e.g., mobile station 110, V-PDE 140, H-PDE 160, BSA server 170, etc.) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions/code may be stored in a memory (e.g., memory 1312, 1342, 1352 or 1362 in FIG. 13) and executed by a processor (e.g., processor 1310, 1340, 1350 or 1360). The memory may be implemented within the processor or external to the processor. The firmware and/or software instructions/code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The instructions/code may be executable by one or more processors and may cause the processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus comprising:
a communication unit to receive one or more signals indicative of a first request for positioning assistance from a mobile station communicating with a visited network;
a processor to determine that a portion of base station almanac (BSA) data applicable for the mobile station is not locally available in a home network, the processor to initiate transmission of a second request for location information for the mobile station to a designated network entity at least in part in response to the determining that the portion of the BSA applicable for the mobile station is not locally available in the home network, the communication unit further to receive one or more signals indicative of location information for the mobile station from the designated network entity, the received location information comprising one or more of BSA data, satellite positioning system (SPS) assistance data, and/or a position estimate for the mobile station, the processor to initiate transmission of positioning assistance information to the mobile station based at least in part on the received location information; and
a memory coupled to the processor.

2. The apparatus of claim 1, the communication unit to receive system parameter information in the first request from the mobile station, and the processor to determine that BSA data applicable for the mobile station is not locally available based at least in part on the system parameter information.

3. The apparatus of claim 2, wherein the system parameter information comprises System Identification (SID) and Network Identification (NID) of the visited network.

4. The apparatus of claim 1, the communication unit to receive the first request at a home position determining entity (H-PDE) in the home network, and the processor to initiate transmission of the second request for BSA data for the mobile station to a BSA server acting as the designated network entity, the BSA server to store BSA data for one or more networks including the visited network.

5. The apparatus of claim 4, the memory to store a table of SIDs for which BSA data is available from the BSA server, and the processor to determine that BSA data applicable for the mobile station is not locally available based at least in part on the table of SIDs.

6. The apparatus of claim 4, the processor to initiate transmission of BSA data for the home network to the BSA server for storage and dissemination by the BSA server.

7. The apparatus of claim 1, the communication unit to receive the one or more signals indicative of the first request at a home position determining entity (H-PDE) in the home network, and the processor to initiate transmission of the second request to a visited PDE (V-PDE) acting as the designated network entity.

8. The apparatus of claim 7, the memory to store a table of SIDs for which BSA data is unavailable and PDEs from which location information is attainable, and the processor to determine that BSA data applicable for the mobile station is not locally available and to determine the V-PDE to send the second request based at least in part on the table of SIDs.

9. The apparatus of claim 1, the communication unit to receive the one or more signals indicative of the first request at a home position determining entity (H-PDE) in the home network, the processor to initiate forwarding the first request as the second request to a visited PDE (V-PDE) acting as the designated network entity, and to initiate forwarding of the location information received from the V-PDE to the mobile station.

10. The apparatus of claim 1, the processor to provide information for a serving sector of the mobile station in the second request, and the communication unit to receive one or more signals indicative of BSA data for only the serving sector from the designated network entity.

11. The apparatus of claim 1, the processor to provide information for a serving sector of the mobile station in the second request, and the communication unit to receive one or more signals indicative of BSA data for the serving sector and at least one neighbor sector from the designated network entity.

12. The apparatus of claim 1, the communication unit to receive one or more signals indicative of BSA data applicable for the mobile station from the designated network entity, the processor to determine SPS assistance data for the mobile station based at least in part on the received BSA data, and to provide the SPS assistance data to the mobile station.

13. The apparatus of claim 1, the communication unit to receive one or more signals indicative of SPS assistance data for the mobile station from the designated network entity, and the processor to initiate transmission of the SPS assistance data to the mobile station.

14. The apparatus of claim 1, the communication unit to receive one or more signals indicative of at least one measurement for at least one sector from the mobile station, the processor to initiate transmission of the at least one measurement in the second request to the designated network entity, the communication unit to receive one or more signals indicative of a position estimate for the mobile station from the designated network entity, and the processor to initiate transmission of the position estimate to the mobile station.

15. The apparatus of claim 1, the communication unit to receive one or more signals indicative of at least one measurement for at least one sector from the mobile station, to receive one or more signals indicative of BSA data for the mobile station from the designated network entity, the processor to determine a position estimate for the mobile station based at least in part on the at least one measurement from the mobile station and the BSA data from the designated network entity, and the processor to initiate transmission of the position estimate to the mobile station.

16. A method comprising:
receiving one or more signals indicative of a first request for positioning assistance at a communication unit of a computing platform from a mobile station communicating with a visited network;
determining that a portion of base station almanac (BSA) data applicable for the mobile station is not locally available in a home network utilizing a processor of the mobile station;
sending a second request for location information for the mobile station to a designated network entity at least in part in response to the determining that the portion of the BSA applicable for the mobile station is not locally available in the home network;
receiving location information for the mobile station from the designated network entity, the received location information comprising one or more of BSA data, satellite positioning system (SPS) assistance data, and/or a position estimate for the mobile station; and
providing positioning assistance to the mobile station based at least in part on the received location information.

17. The method of claim 16, wherein the receiving the one or more signals indicative of the first request comprises receiving the first request at a home position determining entity (H-PDE) in the home network, and wherein the sending the second request comprises sending the second request for BSA data for the mobile station to a BSA server acting as the designated network entity, the BSA server to store BSA data for one or more networks including the visited network.

18. The method of claim 16, wherein the receiving the one or more signals indicative of the first request comprises receiving the first request at a home position determining entity (H-PDE) in the home network, and wherein the sending the second request comprises sending the second request to a visited PDE (V-PDE) acting as the designated network entity.

19. The method of claim 16, wherein the receiving the one or more signals indicative of the first request comprises receiving the first request at a home position determining entity (H-PDE) in the home network, wherein the sending the second request comprises forwarding the first request as the second request to a visited PDE (V-PDE) acting as the designated network entity, and wherein the providing positioning assistance to the mobile station comprises forwarding the location information received from the V-PDE to the mobile station.

20. The method of claim 16, wherein the receiving location information for the mobile station comprises receiving BSA data applicable for the mobile station from the designated network entity, and wherein the providing positioning assistance to the mobile station comprises determining SPS assistance data for the mobile station based at least in part on the received BSA data, and further based at least in part on providing the SPS assistance data to the mobile station.

21. The method of claim 16, wherein the receiving the one or more signals indicative of the first request comprises receiving at least one measurement for at least one sector from the mobile station, wherein the receiving location information for the mobile station comprises receiving BSA data for the mobile station from the designated network entity, and wherein the providing positioning assistance to the mobile station comprises determining a position estimate for the mobile station based at least in part on the one or more measurements from the mobile station and based at least in part on the BSA data from the designated network entity, and providing the position estimate to the mobile station.

22. An apparatus comprising:
means for receiving a first request for positioning assistance from a mobile station communicating with a visited network;
means for determining that base station almanac (BSA) data applicable for the mobile station is not locally available in a home network;
means for sending a second request for location information for the mobile station to a designated network entity;
means for receiving location information for the mobile station from the designated network entity, the received location information comprising one or more of BSA data, satellite positioning system (SPS) assistance data, and/or a position estimate for the mobile station; and
means for providing positioning assistance to the mobile station based at least in part on the received location information.

23. The apparatus of claim 22, wherein the means for receiving the first request comprises means for receiving the first request at a home position determining entity (H-PDE) in the home network, and wherein the means for sending the second request comprises means for sending the second request for BSA data for the mobile station to a BSA server acting as the designated network entity, the BSA server to store BSA data for one or more networks including the visited network.

24. The apparatus of claim 22, wherein the means for receiving the first request comprises means for receiving the first request at a home position determining entity (H-PDE) in the home network, and wherein the means for sending the second request comprises means for sending the second request to a visited PDE (V-PDE) acting as the designated network entity.

25. The apparatus of claim 22, wherein the means for receiving the first request comprises means for receiving the first request at a home position determining entity (H-PDE) in the home network, wherein the means for sending the second request comprises means for forwarding the first request as the second request to a visited PDE (V-PDE) acting as the designated network entity, and wherein the means for providing positioning assistance to the mobile station comprises means for forwarding the location information received from the V-PDE to the mobile station.

26. The apparatus of claim 22, wherein the means for receiving location information for the mobile station comprises means for receiving BSA data applicable for the mobile station from the designated network entity, and wherein the means for providing positioning assistance to the mobile station comprises means for determining SPS assistance data for the mobile station based at least in part on the received BSA data, and means for providing the SPS assistance data to the mobile station.

27. The apparatus of claim 22, wherein the means for receiving the first request comprises means for receiving at least one measurement for at least one sector from the mobile station, wherein the means for receiving location information for the mobile station comprises means for receiving BSA data for the mobile station from the designated network entity, and wherein the means for providing positioning assistance to the mobile station comprises means for determining a position estimate for the mobile station based at least in part on the at least one measurement from the mobile station and the BSA data from the designated network entity, and means for providing the position estimate to the mobile station.

28. A non-transitory computer-readable medium including program code stored thereon, comprising:
    program code to receive a first request for positioning assistance from a mobile station communicating with a visited network;
    program code to determine that a portion of base station almanac (BSA) data applicable for the mobile station is not locally available in a home network;
    program code to send a second request for location information for the mobile station to a designated network entity at least in part in response to a determination that the portion of the BSA applicable for the mobile station is not locally available in the home network;
    program code to receive location information for the mobile station from the designated network entity, the received location information comprising at least one of BSA data, satellite positioning system (SPS) assistance data, and a position estimate for the mobile station; and
    program code to provide positioning assistance to the mobile station based at least in part on the received location information.

29. The computer-readable medium of claim 28, further comprising:
    program code to receive the first request at a home position determining entity (H-PDE) in the home network; and
    program code to send the second request for BSA data for the mobile station to a BSA server acting as the designated network entity, the BSA server storing BSA data for one or more networks including the visited network.

30. The computer-readable medium of claim 28, further comprising:
    program code to receive the first request at a home position determining entity (H-PDE) in the home network; and
    program code to send the second request to a visited PDE (V-PDE) acting as the designated network entity.

31. The computer-readable medium of claim 28, further comprising:
    program code to receive the first request at a home position determining entity (H-PDE) in the home network;
    program code to forward the first request as the second request to a visited PDE (V-PDE) acting as the designated network entity; and
    program code to forward the location information received from the V-PDE to the mobile station.

32. The computer-readable medium of claim 28, further comprising:
    program code to receive BSA data applicable for the mobile station from the designated network entity;
    program code to determine SPS assistance data for the mobile station based at least in part on the received BSA data; and
    program code to provide the SPS assistance data to the mobile station.

33. The computer-readable medium of claim 28, further comprising:
    program code to receive at least one measurement for at least one sector from the mobile station;
    program code to receive BSA data for the mobile station from the designated network entity;
    program code to determine a position estimate for the mobile station based at least in part on the at least one measurement from the mobile station and the BSA data from the designated network entity; and
    program code to provide the position estimate to the mobile station.

34. An apparatus comprising:
    one or more processors to receive base station almanac (BSA) data from one or more networks, to receive one or more requests for BSA data from one or more position determining entities (PDEs) in the one or more networks, the one or more PDEs to transmit the one or more requests for BSA data at least in part in response to determining that a portion of BSA data applicable for one or more mobile stations is not locally available in a home network, the one or more processors to determine whether individual requests of the one or more requests for BSA data is authorized, and to return BSA data to the one or more PDEs for authorized requests; and
    a memory coupled to the one or more processors.

35. The apparatus of claim 34, wherein individual PDEs of the one or more PDEs in the one or more networks serve respective individual networks of the one or more networks and wherein individual PDEs of the one or more PDEs send requests for BSA data for other networks not served by the individual PDEs of the one or more PDEs.

36. The apparatus of claim 34, the one or more processors to receive information for a serving sector of a mobile station from a PDE of the one or more PDEs, the one or more processors to determine BSA data applicable for the mobile station based on the information for the serving sector, and the one or more processors to return the BSA data to the one or more PDEs.

37. The apparatus of claim 36, the one or more processors to initiate transmission of BSA data for the serving sector to the one or more PDEs.

38. The apparatus of claim 36, the one or more processors to provide BSA data for the serving sector and one or more neighbor sectors to the PDEs.

39. The apparatus of claim 36, wherein the information for the serving sector comprises System Identification (SID), Network Identification (NID), and Base Station Identification (BASEJD).

40. The apparatus of claim 34, the one or more processors to receive configuration information indicating which networks are authorized to obtain BSA data from individual networks of the one or more networks, and to determine whether individual requests of the one or more requests for BSA data are authorized based at least in part on the configuration information.

41. The apparatus of claim 34, the one or more processors to receive a request for BSA data from an individual PDE of the one or more PDEs and to provide unmodified BSA data or degraded BSA data to the individual PDE based on configuration information applicable for the individual PDE.

42. A method comprising:
receiving base station almanac (BSA) data from a plurality of networks at a processor of a computing platform;
receiving a plurality of requests for BSA data at the processor of the computing platform from a plurality of respective position determining entities (PDEs) in the plurality of networks, the plurality of PDEs to transmit the plurality of requests for BSA data at least in part in response to determining that a portion of BSA data applicable for one or more mobile stations is not locally available in a home network;
determining whether individual requests of the plurality of requests are authorized utilizing the processor of the computing platform; and
returning BSA data to one or more of the plurality of PDEs for authorized requests.

43. The method of claim 42, further comprising:
receiving configuration information indicating which networks of the plurality of networks are authorized to obtain BSA data from individual networks of the multiple networks, and wherein individual requests of the plurality of requests are authorized based at least in part on the configuration information.

44. The method of claim 42, wherein the returning BSA data to the plurality of PDEs comprises receiving information for a serving sector of a mobile station from individual PDE of the plurality of PDEs for an authorized request, determining BSA data applicable for the mobile station based at least in part on the information for the serving sector, and returning the BSA data to the individual PDE.

45. The method of claim 42, wherein the returning BSA data to the plurality of PDEs comprises providing unmodified BSA data or degraded BSA data to an individual PDE for an authorized request based at least in part on configuration information applicable for the individual PDE.

46. An apparatus comprising:
one or more processors to receive a request for location information for a mobile station communicating with a visited network, the request being sent by a home position determining entity (H-PDE) at least in part in response to determining that base station almanac (BSA) data applicable for the mobile station is not locally available in a home network, and the one or more processors to send location information for the mobile station to the H-PDE, the location information comprising one or more of BSA data, satellite positioning system (SPS) assistance data, and/or a position estimate for the mobile station; and
a memory coupled to the one or more processors to store the location information for the mobile station.

47. The apparatus of claim 46, the one or more processors to process individual requests from the H-PDE as separate transactions.

48. The apparatus of claim 46, wherein the request for location information is sent by the mobile station to the H-PDE and forwarded by the H-PDE, and wherein the location information is sent to the H-PDE and forwarded to the mobile station.

49. A method comprising:
receiving a request at a processor of a computing platform for location information for a mobile station communicating with a visited network, the request being sent by a home position determining entity (H-PDE) at least in part in response to determining that base station almanac (BSA) data applicable for the mobile station is not locally available in a home network; and
sending location information for the mobile station from the computing platform to the H-PDE at least in part in response to the receiving the request for the location information, the location information comprising at least one of BSA data, satellite positioning system (SPS) assistance data, and a position estimate for the mobile station.

50. The method of claim 49, further comprising:
processing individual requests of a plurality of requests from the H-PDE as separate transactions.

51. The method of claim 49, wherein the request for location information is sent by the mobile station to the H-PDE and forwarded by the H-PDE to the computing platform, and wherein the location information is sent from the computing platform to the H-PDE and forwarded to the mobile station.

52. An apparatus comprising:
one or more processors coupled to a communication unit to communicate with a visited network via a radio connection, the one or more processors further to send a request for positioning assistance to a home position determining entity (H-PDE) in a home network, and to receive positioning assistance information provided by the H-PDE based at least in part on location information obtained by the H-PDE from a designated network entity at least in part in response to base station almanac (BSA) data applicable for the mobile station not being locally available in the home network; and
a memory coupled to the at least one processor to store the positioning assistance information.

53. The apparatus of claim 52, the one or more processors coupled to the communication unit to receive system parameter information from a serving cell in the visited network, the one or more processors coupled to the communication unit further to provide the system parameter information in the request sent to the H-PDE, the system parameter information being used by the H-PDE to determine that BSA data applicable for the mobile station is not locally available.

54. A method comprising:
communicating with a visited network via a radio connection utilizing a communication unit coupled to a processor;
sending a request for positioning assistance to a home position determining entity (H-PDE) in a home network utilizing the processor coupled to the communication unit; and
receiving positioning assistance information provided by the H-PDE at the processor coupled to the communication unit, wherein the positioning assistance information is based on location information obtained by the H-PDE from a designated network entity at least in part in response to the base station almanac (BSA) data applicable for the mobile station not being locally available in the home network.

55. The method of claim 54, further comprising:

receiving system parameter information from a serving cell in the visited network at the processor coupled to the communication unit; and wherein the sending the request for positioning assistance to the H-PDE comprises transmitting the system parameter information to the H-PDE, the system parameter information being used by the H-PDE to determine that BSA data applicable for the mobile station is not locally available.

* * * * *